US005659304A

United States Patent [19]
Chakraborty

[11] Patent Number: 5,659,304
[45] Date of Patent: Aug. 19, 1997

[54] SYSTEM AND METHOD FOR COLLISION WARNING BASED ON DYNAMIC DECELERATION CAPABILITY USING PREDICTED ROAD LOAD

[75] Inventor: Shubhayu Chakraborty, Wixom, Mich.

[73] Assignee: Eaton Corporation, Cleveland, Ohio

[21] Appl. No.: 396,627

[22] Filed: Mar. 1, 1995

[51] Int. Cl.[6] .................................................. G08G 1/16
[52] U.S. Cl. .......................... 340/903; 340/435; 340/436; 340/439; 340/904; 364/426.044; 180/167
[58] Field of Search ................... 340/903, 904, 340/435, 436, 439; 364/424.03, 461; 180/167, 169

[56] References Cited

U.S. PATENT DOCUMENTS

| 4,926,450 | 5/1990 | Suzuki et al. | 356/502 |
|---|---|---|---|
| 5,026,153 | 6/1991 | Suzuki et al. | 356/1 |
| 5,053,979 | 10/1991 | Etoh | 364/565 |
| 5,161,632 | 11/1992 | Asayama | 180/167 |
| 5,165,497 | 11/1992 | Chi | 180/169 |
| 5,166,681 | 11/1992 | Bottesch et al. | 340/933 |
| 5,197,562 | 3/1993 | Kakinami et al. | 180/169 |
| 5,230,400 | 7/1993 | Kakinami et al. | 180/169 |
| 5,286,099 | 2/1994 | Fujita et al. | 303/103 |
| 5,303,019 | 4/1994 | Irie | 356/1 |
| 5,314,037 | 5/1994 | Shaw et al. | 180/169 |
| 5,341,144 | 8/1994 | Stove | 342/70 |
| 5,357,438 | 10/1994 | Davidian | 364/461 |
| 5,386,285 | 1/1995 | Asayama | 356/1 |
| 5,388,048 | 2/1995 | Yavnayi et al. | 364/461 |
| 5,400,864 | 3/1995 | Winner et al. | 180/169 |
| 5,416,711 | 5/1995 | Gran et al. | 364/436 |
| 5,436,835 | 7/1995 | Emry | 364/426.01 |
| 5,530,651 | 6/1996 | Uemura et al. | 340/435 X |

FOREIGN PATENT DOCUMENTS

0612641A1  8/1994  European Pat. Off. .

OTHER PUBLICATIONS

"Deliverance from Evil", Advertisement from Heavy Duty Trucking Magazine, May, 1994.

Primary Examiner—Jeffery Hofsass
Assistant Examiner—Daryl C. Pope
Attorney, Agent, or Firm—Brooks & Kushman PC

[57] ABSTRACT

A system and method for collision warning utilize a sensor to determine an inter-vehicle distance and/or closing rate relative to a forward vehicle. A predicted vehicle road load is determined using a predetermined number of previous road load values which is then utilized to determine whether the vehicle has sufficient deceleration capability so as to avoid a collision without operator intervention. The vehicle road load accounts for various forces both internal and external to the vehicle which resist forward motion including those due to gravity and aerodynamic drag, and those provided by an engine retarder or downshifting of an automatic transmission. The present invention thus avoids spurious collision indications.

16 Claims, 2 Drawing Sheets

SYSTEM AND METHOD FOR COLLISION WARNING BASED ON DYNAMIC DECELERATION CAPABILITY USING PREDICTED ROAD LOAD

TECHNICAL FIELD

The present invention relates to a system and method for warning of a possible collision based on dynamic vehicle deceleration ability determined using predicted road load.

BACKGROUND ART

The availability of inexpensive microprocessors and sophisticated electronic components has facilitated implementation of advanced safety and convenience features in a variety of automotive and trucking applications. As control systems become more complex and sophisticated, they are capable of providing the vehicle operator with information having various degrees of criticality. Regardless of the type of information conveyed to the vehicle operator, it is important to consistently provide accurate information such that the vehicle operator may depend on the content of the information. Most operators would prefer to not have any information provided rather than having information of questionable reliability.

Recently, collision warning systems for vehicles have become commercially available. These systems utilize an electromagnetic beam, such as a microwave, laser, or ultrasonic beam, to detect the distance and/or closing rate between the host vehicle and a forward vehicle or other object to warn the driver of a possible impending collision. Obviously, it is important for these systems to consistently provide accurate information to the vehicle operator. Accurate information includes warning the vehicle operator when a collision is possible or probable, but also includes not warning the operator when a collision is unlikely or unprobable. That is, it is undesirable for the collision warning system to trigger false alarms since the vehicle operator may ignore it when an actual alarm condition is indicated or may disable the collision warning system altogether.

Some prior art systems automatically decelerate the vehicle to maintain a predetermined following distance behind a forward vehicle. An example of such a system is described in U.S. patent application Ser. No. 08/396,640 entitled "System and Method for Intelligent Cruise Control Using Standard Engine Control Modes", filed Mar. 1, 1995 and assigned to the assignee of the present invention, the disclosure of which is hereby incorporated by reference in its entirety. Many prior art systems which provide a collision warning utilize a fixed distance threshold which may be measured in feet, or a headway distance which may be measured in seconds and varies with the current speed of the vehicle. However, such prior art systems do not account for the dynamic deceleration capabilities of the vehicle due to the current operating environment. Thus, these systems may unnecessarily trigger an alarm when the vehicle is capable of avoiding a collision without driver intervention.

Collision warning systems which trigger an alarm based on a fixed distance or fixed headway distance are particularly difficult to utilize in tractor semi-trailer vehicle applications due to the wide range of vehicle weights ranging from bob-tail to a fully loaded semi-trailer. In these applications the vehicle weight may vary by 300% or more. This results in a wide range of deceleration capabilities since a heavily loaded vehicle at zero throttle will decelerate less rapidly than a lightly loaded vehicle when descending a grade, and in many instances may even accelerate. Likewise, a heavily loaded vehicle can decelerate more rapidly when climbing a grade than a lightly loaded vehicle. Furthermore, medium and heavy-duty trucking applications experience more aerodynamic drag than typical automotive applications. Thus, dynamic determination of deceleration capability is particularly desirable for these applications which include MVMA Class 7 and Class 8 vehicles.

DISCLOSURE OF THE INVENTION

Thus, it is an object of the present invention to provide a system and method for improved collision warning based on dynamic deceleration capability of the vehicle.

It is a further object of the present invention to provide a system and method for collision warning which utilize a predicted road load to determine the vehicle deceleration capability.

Yet another object of the present invention is to provide a system and method for collision warning which utilize a predetermined number of past road load calculations to predict a future road load value.

A still further object of the present invention is to provide a system and method for collision warning which account for current vehicle operating conditions as well as vehicle equipment to determine vehicle deceleration capability.

Another object of the present invention is to provide a system and method for collision warning which determine vehicle road load utilizing engine parameters broadcast from the engine control module of the vehicle.

Another object of the present invention is to provide a system and method for collision warning which predict a collision based on dynamic deceleration capability, inter-vehicle distance, and closing rate.

A still further object of the present invention is to provide a system and method for collision warning which alert the vehicle operator to a potential collision only when the predicted deceleration capability is insufficient to decelerate the vehicle such that intervention from the vehicle operator is required.

An additional object of the present invention is to provide a system and method for collision warning which integrate collision warning functions with intelligent cruise control functions.

In carrying out the above objects and other objects and features of the present invention, a system is provided for use in a vehicle having an engine controlled by an electronic control module, the system includes a distance sensor for determining an inter-vehicle distance and closing rate and control logic in communication with the distance sensor for determining current vehicle road load, computing vehicle deceleration capability utilizing the road load, and predicting a collision based on a predicted vehicle deceleration capability, the predicted vehicle deceleration capability being based on previous vehicle road load determinations. In one embodiment, the vehicle also includes an engine retarder and an automated transmission in communication with the control logic and the control logic computes vehicle deceleration capability utilizing characteristic deceleration information for the available deceleration devices.

A method is also provided by the present invention which includes sensing an inter-vehicle distance, determining a closing rate based on the inter-vehicle distance, and determining the current vehicle road load and deceleration capability. The method also includes predicting a future road load value based on a predetermined number of previously determined road load values and predicting a collision based on the predicted deceleration capability, inter-vehicle distance, and closing rate. In a preferred embodiment, the method utilizes Newton's divided difference technique to extrapolate a future road load value based on previously stored road load values.

The advantages accruing to the present invention are numerous. The system and method of the present invention provide a more reliable indication of a possible impending collision by utilizing current operating conditions and accounting for variation in vehicle loading conditions and available vehicle deceleration devices such as an automated transmission or engine retarder. The system and method of the present invention provide an indication of the accumulated effect of deceleration forces acting on the vehicle utilizing information broadcast from the electronic control module so that sophisticated sensors are not needed. Thus, the present invention provides an improvement to the reliability of information generated by a collision warning system to reduce the instances of false alarms so as to increase the confidence of the vehicle operator as to the adeptness of the collision warning system.

The above objects and other objects, features, and advantages of the present invention will be readily appreciated by one of ordinary skill in this art from the following detailed description of the best mode for carrying out the invention when taken in connection with the accompanying drawings.

BEST MODE(S) FOR CARRYING OUT THE INVENTION

Figure 1:
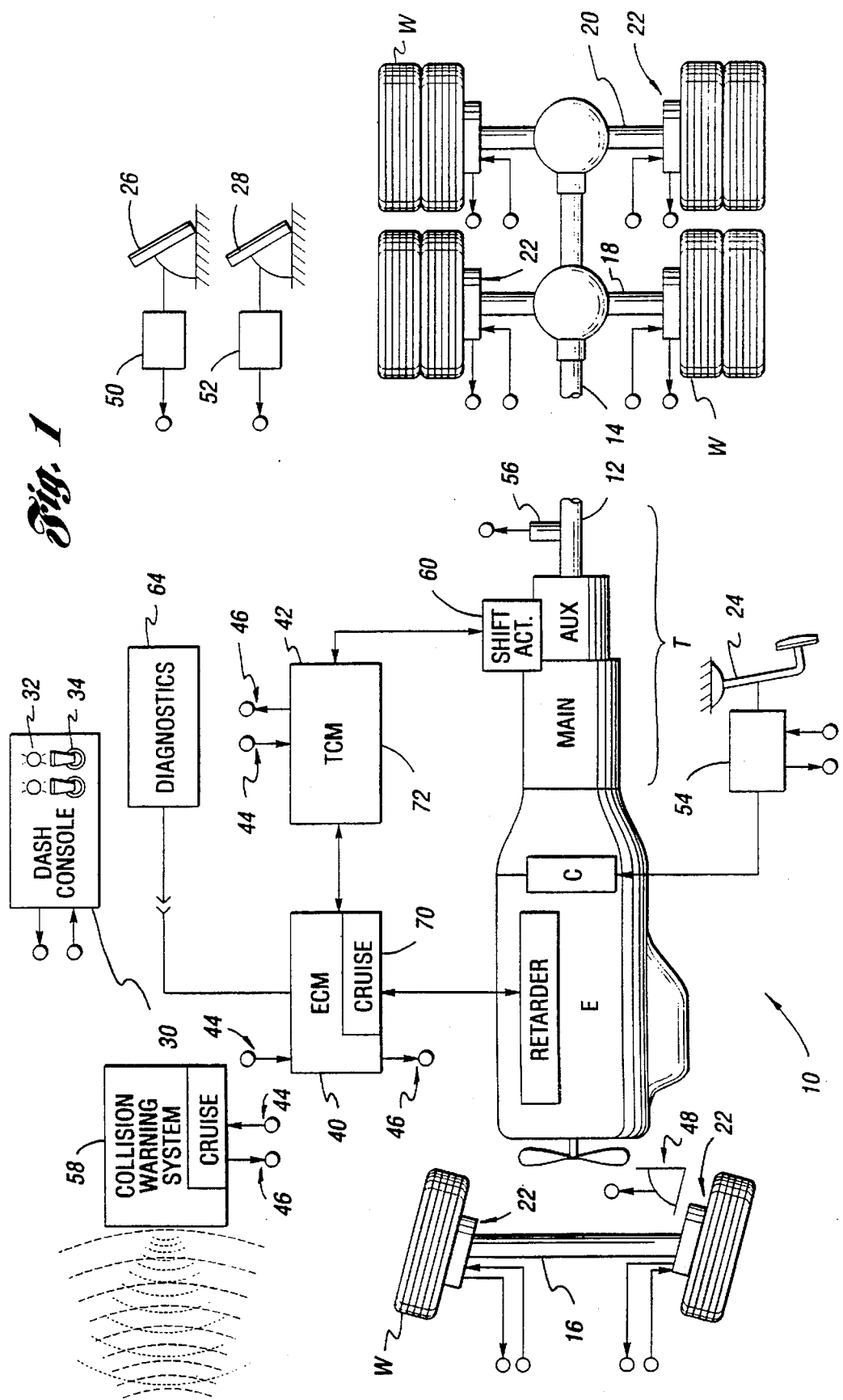
FIG. 1 is a block diagram of a vehicle system having a collision warning system incorporating the system and method of the present invention.

Referring now to FIG. 1, a graphical representation of one embodiment of a system and method for collision warning according to the present invention is shown. FIG. 1 depicts a vehicle 10, such as a tractor of a tractor semi-trailer vehicle, having an electronically controlled engine E coupled to a compound transmission T via a clutch mechanism C. Although a vehicle such as depicted in FIG. 1 represents one of the possible applications for the system and method of the present invention, it should be appreciated that the present invention transcends any particular type of vehicle employing an electronically controlled engine implementing standard engine control functions which utilize road load information, distance information and/or closure rate information as described herein.

In a preferred embodiment, transmission T is preferably a compound change gear or change speed transmission having a main section connected in series with an auxiliary section which includes an output shaft 12 coupled to a vehicle drive shaft 14. Vehicle 10 includes at least two axles such as a steer axle 16 and at least one drive axle, such as axles 18 and 20. Each axle supports corresponding wheels W having foundation or service brake components 22 which may be manually or automatically actuated depending upon the particular application and operating conditions. For example, a vehicle equipped with ABS may assume automatic control of braking under appropriate conditions such as when the vehicle is braking and the system detects a sufficient slip differential among one or more wheels. Service brake components 22 may include wheel speed sensors and electronically controlled pressure valves to effect control of the vehicle braking system as described herein.

Vehicle 10 also may include conventional operator controls such as clutch pedal 24, accelerator pedal 26, brake pedal 28, and an operator interface, such as dashboard control console 30, which may include any of a number of output devices 32, such as lights, LED or LCD displays, alarms, buzzers, and the like. Dashboard control console 30 also includes various input devices 34, such as switches, potentiometers, push buttons, and the like. The vehicle control system includes an electronic control module such as engine control module (ECM) 40 and preferably includes an additional electronic control module for effecting control of transmission T, such as transmission control module (TCM) 42. Of course, engine and transmission control may be combined in a single electronic control module for some applications. The ECM 40 and TCM 42 communicate with a variety of sensors via inputs 44 and with numerous actuators via outputs 46. Sensors may include a steering angle sensor 48, wheel speed sensors (included in braking components 22), an electronic accelerator pedal sensor (APS) 50, a brake pedal sensor or switch 52, a clutch control/sensor 54, and an output speed sensor 56, among numerous others. The vehicle also includes a collision warning system 58 which preferably provides distance and closing rate information relative to vehicle 10 and at least one forward vehicle or object. In a preferred embodiment, collision warning system 58 is a commercially available Eaton VORAD EVT-200 collision warning system.

Actuators may include a shift actuator 60 for automatically effecting a gear shift within transmission T, electronically controlled pressure valves (included in braking components 22), and an engine retarder 62, or the like (such as a drive-line retarder). As is known, an engine retarder is a device utilized to supplement the foundation or service brakes when descending long grades and to prolong service brake life in high-frequency start and stop operation. Retarders may be categorized as engine brakes, exhaust brakes, hydraulic retarders and electric retarders. In a preferred embodiment, engine retarder 62 is an engine brake such as the well known Jacobs engine brake. This device converts a power producing diesel engine into a power absorbing air compressor. This is achieved by shutting off the fuel and hydraulically opening the exhaust valve as two or more pistons approach top dead center during the compression stroke. Although many engine manufacturers disable the engine brake when cruise control is engaged, some systems may utilize the engine retarder when intelligent cruise control is engaged to enhance vehicle deceleration. This information can be utilized by the present invention to provide a more accurate indication of deceleration capability.

As also illustrated in FIG. 1, a diagnostics module 64 may be selectively connected to ECM 40 and preferably communicates status messages as defined by the SAE J1587 standard published by the Society of Automotive Engineers, the disclosure of which is hereby incorporated by reference in its entirety. These messages are also available to other system microprocessors during normal operation such as TCM 42 and collision warning system 58 and include information such as current engine speed and torque, accelerator position, road speed, cruise control status, and cruise control set speed, among many others.

ECM 40 communicates with TCM 42 preferably according to either the SAE J1922, SAE J1939, or SAE J1587 standard utilizing a communication link conforming to the SAE J1708 physical layer standard all of which are published by the Society of Automotive Engineers, the disclosures of which are hereby incorporated by reference in their entirety. Alternatively, the controller area network (CAN) standard may be utilized for controller communications. Preferably, collision warning system 58 communicates with ECM 40 and/or TCM 42 via a communication link complying with SAEJ1708 or CAN and communication standards substantially similar to SAE J1922 or SAE J1939. It will be appreciated by one of ordinary skill in the art that the various connections between electronic controllers, sensors, and actuators may be changed to accommodate the particular requirements of a specific application without departing from the spirit or scope of the present invention. Similarly, various communication links and protocols may be accommodated with appropriate translators or converters. For example, in one embodiment of the present invention, distance sensor 58 communicates directly with ECM 40 utilizing J1708 and J1939. In another embodiment of the present invention, distance sensor 58 communicates serially via an RS232 link which is converted first to J1708 and then to CAN protocol to communicate with TCM 42 which then communicates with ECM 40 via a CAN/J1708 converter and J1922 messaging protocol. Thus, the present invention relies on the exchange of control and status information which is independent of the particular data path, and in some cases the messaging protocol, utilized in the information exchange.

The ECM 40, TCM 42, and collision warning system 58 contain control logic rules which may be implemented in a variety of combinations of hardware circuitry components and programmed microprocessors to effect control of the various vehicle systems and subsystems. Often, control functions are logically separated and have specific input parameters, control equations, and output parameters which may be unique or shared with other logical control functions and/or other system and subsystem controllers. Cruise control functions (either intelligent or traditional) are represented schematically by cruise control block 70 within ECM 40 which represents the particular logic rules utilized to effect these functions. Similarly, in a preferred embodiment, collision warning system 58 includes a cruise control block which represents the logic rules necessary to implement intelligent cruise control functions. It should be recognized that the present invention need not be utilized with any particular type of cruise control system which may or may not automatically decelerate the vehicle. However, the accuracy of predicted collision using the present invention is improved if the collision warning system is aware of any systems or subsystems which may provide additional automatic deceleration capabilities without driver intervention. This information is provided via status messages defined in SAE J1587 which indicate the presence of various vehicle equipment.

Figure 2:
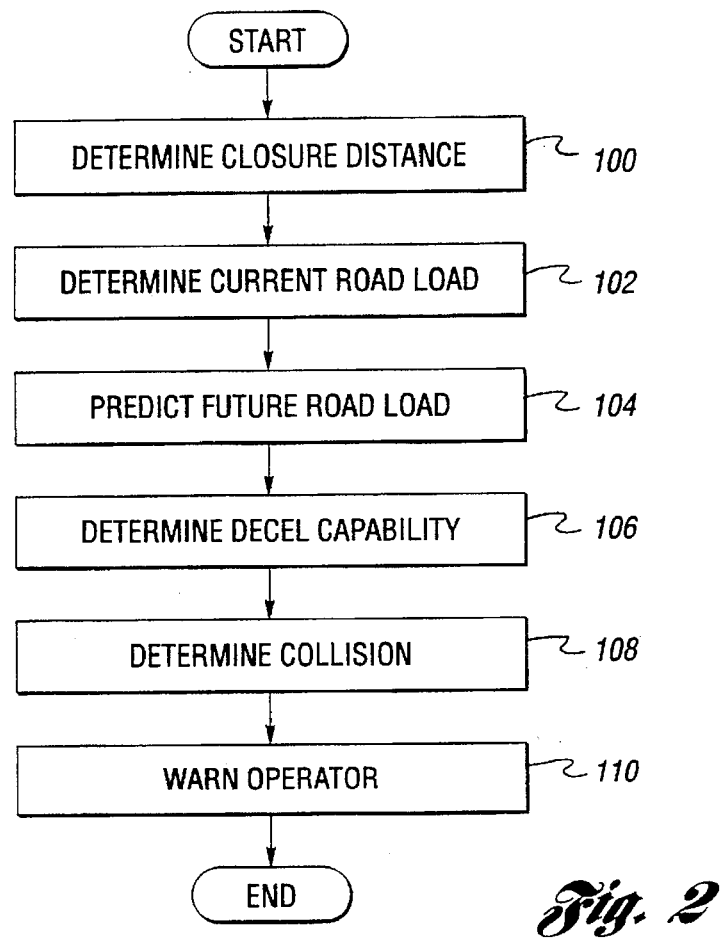
FIG. 2 is a flow chart depicting a system and method for collision warning according to the present invention.

Referring now to FIG. 2, a flow chart is shown illustrating the system and method of collision warning according to the present invention. It should be recognized that the flowchart presented in FIG. 2 in describing the present invention depicts sequential processing of the method steps although any of a number of processing strategies could be utilized without departing from the spirit or scope of the present invention. For example, if the control logic is implemented in hardware, many of the method steps may be performed simultaneously or nearly simultaneously. Similarly, in a preferred embodiment an interrupt driven processing strategy is utilized to achieve the objects and advantages of the present invention. One of ordinary skill in the art will also recognize that the concepts of the present invention may obviously be extended to a corresponding parallel implementation without departing from the spirit or the scope of the present invention. Similarly, a combined sequential/parallel implementation utilizing hardware and/or software to accomplish one or more of the objects and advantages of the present invention is within the contemplation of the present invention.

The control and calculation steps illustrated in FIG. 2 are preferably performed by control logic within collision warning system 58 illustrated in FIG. 1. However, the present invention is independent of the actual location of the control logic provided the relevant information is communicated to and from appropriate vehicle systems and subsystems. The inter-vehicle distance between the host vehicle and at least one forward vehicle is determined at block 100. In a preferred embodiment, this information is provided utilizing a commercially available sensor. Preferably, the sensor also determines the closing rate of the host vehicle relative to each forward target vehicle or object. However, inter-vehicle distance information is easily available by integrating the relative velocity or closing rate information.

Block 102 of FIG. 2 determines the current road load of the vehicle. Road load represents the difference between the driving effort necessary to maintain the current vehicle road speed of the vehicle. Thus, the road load represents a number of forces acting on the vehicle in the direction of motion (longitudinal or x-direction) which are both internal and external to the vehicle. For example, road load incorporates external forces, such as the force of gravity when ascending or descending an incline and aerodynamic drag, in addition to internal forces, such as frictional forces of the vehicle engine and transmission.

Determination of current vehicle road load begins with Newton's second law of motion applied to the longitudinal direction:

$$\Sigma F = m a_x \qquad (1)$$

where the forces acting on the vehicle include the driving force which is resisted by the combined forces represented by the road load. The driving force can be computed utilizing information provided by the ECM which includes the peak torque available from the engine and the current percentage of peak torque being delivered according to:

$$Tq_E = Tq_{Del} * Tq_{Peak} \qquad (2)$$

where $Tq_E$ represents the engine torque delivered by the engine. This value is used to calculate the torque delivered to the vehicle wheels according to:

$$Tq_W = Tq_E * Ratio_{Trans} * Ratio_{Axle} \qquad (3)$$

where $Ratio_{Trans}$ represents the current transmission gear ratio and $Ratio_{Axle}$ represents the axle ratio. Alternatively, equation (3) may be expressed as:

$$F_{Drive} = Tq_E * \frac{ES}{RS} * \frac{\pi}{44} \qquad (4)$$

where ES represents the engine speed in rpm and RS represents the road speed in mph as determined by the ECM and broadcast according to the SAE J1587 standard. The radius of the vehicle tires is incorporated into the vehicle speed measured in mph by the ECM. Applying equation (1) yields:

$$\Sigma F = m * a_x = F_{Drive} - F_{Road} \qquad (5)$$

and solving for $F_{Road}$ yields:

$$F_{Road} = F_{Drive} - m * a_x \qquad (6)$$
$$= F_{Drive} - \frac{W}{g} * \frac{dv}{dt}$$
$$= F_{Drive} - \frac{\mu_W}{g} * \frac{dv}{dt}$$

where g represents the acceleration due to gravity, W represents the weight of the vehicle, dv/dt represents the time rate of change of vehicle velocity, and $\mu_W$ represents the mean value or expected value for gross combined vehicle weight (GCW). A number of methods may be utilized to provide an estimate of GCW such as those disclosed in U.S. Pat. Nos. 5,335,566 and 5,272,939, the disclosures of which are hereby incorporated by reference in their entirety.

Figure 3:
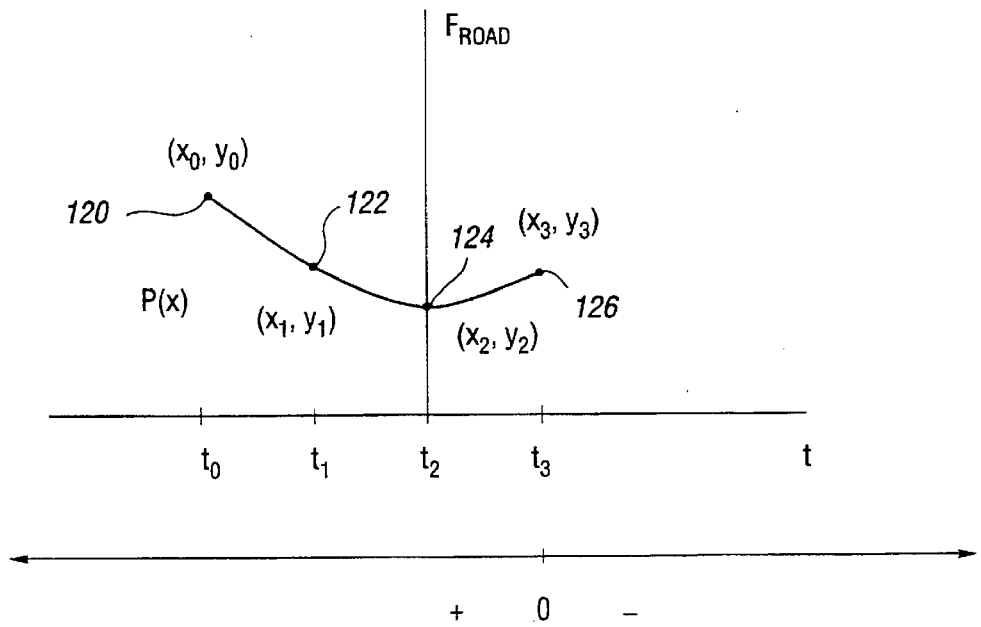
FIG. 3 is a graph illustrating the operation of a device for predicting road load according to the present invention.

The current value determined for $F_{Road}$ can be used to predict collision probability. However, since the road load may change between the time when a forward vehicle first comes into range of the collision warning system and the time of a potential collision, it is desirable to predict the road load at the estimated time of collision as represented by block 104. A number of techniques may be utilized to predict the future road load value based on a predetermined number of previous road load values. In a preferred embodiment, Newton's divided difference technique is utilized to extrapolate a future road load value from previous road load values as illustrated in FIG. 3 and explained in detail below.

Block 106 determines the deceleration capability of the vehicle based on the predicted road load determined at block 104. This determination assumes that the engine will be defueled so that the driving force, $F_{Drive}$, is zero. Block 106 may incorporate additional deceleration capability provided by an engine brake, downshifting of an automated transmission, or automatic application of the service brakes. However, block 106 does not include the deceleration capability of any vehicle system or subsystem which requires operator intervention such as manual application of the service brakes. The deceleration capability due to defueling and predicted road load is determined according to:

$$a_{Defuel} = \frac{F_{Drive} - F_{Road}(\text{future})}{\frac{\mu_W}{g}} \qquad (7)$$
$$= \frac{-F_{Road}(\text{future})}{\frac{\mu_W}{g}}$$

where $a_{Defuel}$ represents the deceleration capability due to defueling of the engine, and $F_{Road}(\text{future})$ represents the predicted road load. The total deceleration capability of the vehicle is then given by summing the deceleration capability of each available vehicle system or subsystem which is automatically actuated according to:

$$a_{Total} = \Sigma a \qquad (8)$$
$$= a_{Defuel} + a_{Trans} + a_{Retard} + a_{Brake} + a_{Misc}$$

where $a_{Total}$ represents the total vehicle deceleration capability, $a_{Retard}$ represents deceleration available from an engine retarder, $a_{Brake}$ represents deceleration available from automatically actuated service brakes, and $a_{Misc}$ represents other optional vehicle equipment which may provide additional deceleration.

Block 108 of FIG. 2 then uses the total deceleration capability to determine a possible collision by substituting the values into the basic distance equation:

$$x(t) = x_0 + t\frac{dx}{dt} - \frac{1}{2}t^2\frac{d^2x}{dt^2} \qquad (9)$$
$$= x_0 + tv - \frac{1}{2}t^2 a_{Total}$$

where $x_0$ represents the inter-vehicle distance and v represents the closing rate between a forward vehicle and the host vehicle. If the result of equation (9) is negative, a collision is indicated and block 110 warns the operator via a buzzer, light, or the like. Of course, a safety factor (threshold) may be utilized such that an alarm is sounded by block 110 if the result of equation (9) is below a predetermined threshold.

Referring now to FIG. 3, a graph is shown illustrating one technique for predicting future road load according to the present invention. The graph of FIG. 3 plots road load as a function of time t and distance x. Points 120 and 122 having coordinates $(x_0, y_0)$ and $(x_1, y_1)$ represent previously computed and stored values for road load at times $t_0$ and $t_1$, respectively. Point 124 with coordinates $(x_2, y_2)$ corresponds to the current road load at time $t_2$. The curve passing through the points is represented by P(x). Point 126 represents the predicted value P(x) at future time $t_3$ where the inter-vehicle distance is predicted to be zero, i.e. the point of collision. The future value for the road load can then be determined based on a predetermined number of previous road load values using any of a number of extrapolation or prediction techniques.

The actual technique and the number of previous road load values utilized to predict the future road load value will depend on the particular application. In a preferred embodiment, Newton's divided difference technique is utilized with three (3) road load values to determine a future road load value according to:

$$P(x) = A_0 + A_1(x - x_0) + A_2(x - x_1) \qquad (10)$$

where:

$$A_0 = y_0 \qquad (11)$$

$$A_1 = \frac{y_1 - y_0}{x_1 - x_0} \text{ and}$$

$$A_2 = \frac{\frac{y_2 - y_1}{x_2 - x_1} - \frac{y_1 - y_0}{x_1 - x_0}}{x_2 - x_0}$$

The predicted value is then utilized to determine the projected deceleration capability of the vehicle at the time of the predicted collision.

It is understood, of course, that while the forms of the invention herein shown and described include the best mode contemplated for carrying out the present invention, they are not intended to illustrate all possible forms thereof. It will also be understood that the words used are descriptive rather than limiting, and that various changes may be made without departing from the spirit or scope of the invention as claimed below.

What is claimed is:

1. A system for warning of a potential collision of a vehicle, the system comprising:

a sensor for determining a distance between the vehicle and a forward object;

control logic in communication with the sensor for indicating a potential collision based on a position value which is a function of a predicted vehicle road load value based on a predetermined number of previously determined vehicle road load values, the predicted vehicle road load value being predicted for an estimated future collision time.

2. The system of claim 1 wherein the control logic is operative to predict a vehicle road load value based on a predetermined number of previously determined road load values utilizing a divided difference technique.

3. The system of claim 1 wherein the sensor determines a closing rate between the vehicle and the forward object and wherein the control logic indicates a potential collision based on a position value which is a function of the distance, the closing rate, and the predicted vehicle road load value.

4. The system of claim 3 wherein the control logic determines the position value according to:

$$x(t) = x_0 + tv - \tfrac{1}{2}t^2 a_{Total} \qquad (12)$$

where t represents time in seconds, $x_0$ represents the distance, v represents the closing rate, and $a_{Total}$ represents deceleration capability of the vehicle based on the predicted vehicle road load value.

5. The system of claim 4 wherein the vehicle includes an engine retarder characterized by a first deceleration capability and an automated transmission characterized by a second deceleration capability and wherein $a_{Total}$ includes the first and second deceleration capabilities.

6. A system for warning of a potential collision of a vehicle, the system comprising:

a sensor for determining a distance and closing rate relative to at least one forward object; and control logic in communication with the sensor for determining a current vehicle road load value, predicting a future vehicle road load value based on a predetermined number of previously determined current vehicle road load values, computing future vehicle deceleration capability utilizing the predicted road load, and predicting a collision based on a position value which is a function of the distance, the closing rate, and the future deceleration capability.

7. The system of claim 6 further comprising:

an alarm in communication with the control logic; and wherein the control logic is further operative to communicate an alarm signal to the alarm when the position value is below a predetermined threshold value.

8. The system of claim 6 wherein the vehicle includes an engine and at least one tire and wherein the control logic determines the current vehicle road load value by subtracting a product of the mass of the vehicle and vehicle road speed, from vehicle driving force delivered to the at least one tire from the engine.

9. The system of claim 8 wherein the driving force is determined according to:

$$T_{qW} = T_{qE} * \frac{ES}{RS} * \frac{\pi}{44} \qquad (13)$$

where %Tq represents current percentage of peak engine torque, $Tq_{Peak}$ represents peak engine torque, ES represents engine speed in rpm, and RS represents vehicle speed in mph.

10. A method for warning of a potential collision of a vehicle having a sensor for determining an inter-object distance, the method comprising:

sensing the inter-object distance relative to at least one forward object;

determining a closing rate based on the inter-object distance;

determining a vehicle road load value based on a difference between vehicle driving force and a product of vehicle mass and acceleration;

determining a position value based on the inter-object distance, the closing rate, and the vehicle road load value; and indicating a potential collision when the position value is less than a predetermined threshold value.

11. The method of claim 10 wherein the step of determining a vehicle road load value comprises predicting a vehicle road load value for an estimated time of collision based on a predetermined number of previously determined road load values.

12. The method of claim 10 wherein the step of determining a vehicle road load value comprises predicting a vehicle road load value for an estimated time of collision based on a predetermined number of previously determined road load values using a divided difference technique.

13. The method of claim 10 wherein the position value is determined according to:

$$x(t) = x_0 + tv - \tfrac{1}{2}t^2 a_{Total} \qquad (14)$$

where t represents time in seconds, $x_0$ represents the inter-object distance, v represents the closing rate, and $a_{Total}$ represents deceleration capability of the vehicle based on the vehicle road load value.

14. The method of claim 13 wherein the vehicle includes an engine retarder characterized by a first deceleration capability and an automated transmission characterized by a second deceleration capability and wherein $a_{Total}$ includes the first and second deceleration capabilities.

15. The method of claim 10 wherein the vehicle includes an engine and at least one tire and wherein the step of determining the vehicle road load value comprises subtracting a product of vehicle mass and the closing rate from vehicle driving force delivered from the engine to the at least one tire.

16. The method of claim 15 wherein the driving force is determined according to:

$$T_{qW} = T_{qE} * \frac{ES}{RS} * \frac{\pi}{44} \qquad (15)$$

where %Tq represents current percentage of peak engine torque, $Tq_{Peak}$ represents peak engine torque, ES represents engine speed in rpm, and RS represents vehicle speed in mph.

* * * * *